(12) United States Patent
Criddle et al.

(10) Patent No.: US 6,938,614 B2
(45) Date of Patent: Sep. 6, 2005

(54) AIR INTAKE ARRANGEMENT AN INTERNAL COMBUSTION ENGINE

(75) Inventors: Mark Anderton Criddle, Chelmsford (GB); Kevin Paul Cutts, Standford-le-Hop (GB); Olivier Henri Eugene Desmons, Saint Symphorien (FR); Guy Morgan, Chelmsford (GB); Scott John Moore, Romford (GB); Guy David Morris, South Woodlam Ferrers (GB); John Charles New, Basildon (GB); James Justin Tindall, London (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 46 days.

(21) Appl. No.: 10/343,195

(22) PCT Filed: Jul. 26, 2001

(86) PCT No.: PCT/GB01/03375

§ 371 (c)(1),
(2), (4) Date: Sep. 29, 2003

(87) PCT Pub. No.: WO02/10578

PCT Pub. Date: Feb. 7, 2002

(65) Prior Publication Data

US 2004/0112325 A1 Jun. 17, 2004

(30) Foreign Application Priority Data

Jul. 28, 2000 (GB) ............................................ 0018428
Sep. 28, 2000 (GB) ............................................ 0023776

(51) Int. Cl.$^7$ ........................ F02B 37/10; F02B 39/10; F02D 23/00; F02M 35/02; F02M 35/10
(52) U.S. Cl. .............. 123/559.1; 60/605.1; 123/198 E; 180/68.3
(58) Field of Search ..................... 60/605.1; 123/559.1, 123/198 E; 180/68.3

(56) References Cited

U.S. PATENT DOCUMENTS

| | | | | |
|---|---|---|---|---|
| 4,243,010 A | * | 1/1981 | Zopfi ....................... | 123/559.1 |
| 4,445,336 A | * | 5/1984 | Inoue ....................... | 606/605.1 |
| 4,757,686 A |   | 7/1988 | Kawamura et al. ........... | 60/608 |
| 4,976,327 A |   | 12/1990 | Abujudom, II et al. .... | 180/68.3 |
| 5,058,558 A | * | 10/1991 | Ueda et al. .............. | 123/559.1 |
| 5,706,790 A | * | 1/1998 | Kemmler et al. .......... | 123/564 |
| 5,937,831 A | * | 8/1999 | Volkmann et al. .......... | 123/564 |
| 6,769,411 B2 | * | 8/2004 | Fabiani ...................... | 123/478 |

FOREIGN PATENT DOCUMENTS

| | | | |
|---|---|---|---|
| DE | 3205721 | | 8/1983 |
| DE | 3618449 | | 12/1987 |
| DE | 4102414 | | 7/1992 |
| FR | 2488330 | | 2/1982 |
| FR | 2764944 A | * | 12/1998 |
| GB | 2155542 | | 9/1985 |
| GB | 2182391 | | 5/1987 |
| JP | 59018227 | | 1/1984 |
| WO | WO99/17008 | | 4/1999 |

* cited by examiner

*Primary Examiner*—Sheldon J Richter
(74) *Attorney, Agent, or Firm*—Brinks Hofer Gilson & Lione (57) ABSTRACT

An air intake apparatus for supplying air to an internal combustion engine comprises a hollow enclosure, an air filter and an air compressor which when activated compresses air supplied to the engine. The enclosure houses the air filter and compressor. An engine air supply path through the enclosure passes from an air inlet to the enclosure to an air outlet from the enclosure via the air filter, said enclosure inlet and enclosure outlet defining respectively an upstream end of the air supply path and a downstream end of the air supply path. The enclosure housing is subdivided by a dividing plate which holds the air filter upstream of the air compressor. The dividing plate also has an air inlet feature to allow air to enter an inlet to the air compressor after the air has passed through the air filter.

11 Claims, 12 Drawing Sheets

AIR INTAKE ARRANGEMENT AN INTERNAL COMBUSTION ENGINE

BACKGROUND a. Field of the Invention

The present invention relates to an air intake arrangement for an internal combustion engine.

b. Related Art

There are many factors that characterize the torque output of any given internal combustion engine, for example the swept volume within cylinders, cylinder configuration, the bore-to-stroke ratio, the compression ratio, valve train arrangement, and the inlet and exhaust arrangement.

Engine developers are constantly "tuning" engines, that is, adjusting these parameters and others in the search for improved fuel economy and performance. However, this does not necessarily result in increased power or torque as perceived by the driver. In real world driving conditions it is engine torque that is most important to the driver's perception of performance (or performance feel), and particularly engine torque delivered at lower engine speeds (rpm), for example, below 3500 rpm for a typical light duty passenger car application.

For this reason, an engine may need to be tuned to give higher torque at lower rpm, but this will typically result in a loss of torque at higher engine speed, for example an engine speed that is above about 3500 rpm. This is particularly a problem with small capacity gasoline engines, prevalent in the European marketplace.

The same engine could easily be 're-tuned' to deliver the same torque but at much higher crank speeds. This results in significantly higher peak power but at the expense of torque at lower rpm. Whilst this will appeal to the 'sporting' driver, acceleration performance is reduced at lower engine speeds.

Engine designers have employed a multitude of techniques and technologies in an attempt to overcome this traditional compromise. Examples of such systems are variable geometry intake systems, variable camshaft timing and variable valve lift and timing. All of these approaches are designed to maintain more than one 'state of tune' depending on operating conditions.

Another commonly used technique is to reject engine tuning as a method for increased performance and instead pump air into the engine by means of a turbocharger or supercharger. Such forced induction generally results in significant increases in torque and power.

Such air compressors inevitably make some noise, and require cooling, particularly if the compressors are driven partly or entirely by an electric motor. This must be done in such a way that the space occupied by the compressor does not impinge unduly on other components near the engine. This is an increasingly difficult problem with modern motor cars, which are increasingly crowded under the hood or bonnet.

It is also important that an air compressor is inexpensive, if this is to be used with otherwise conventional, low capacity motor vehicle engines.

SUMMARY OF THE INVENTION

It is an object of the present invention to provide an air intake apparatus for an internal combustion engine which addresses these issues.

According to the invention, there is provided an air intake apparatus for supplying air to an internal combustion engine, comprising a hollow enclosure, an air filter and an air compressor which when activated compresses air supplied to the engine, the enclosure housing the air filter and compressor, an engine air supply path through the enclosure that passes from an air inlet to the enclosure to an air outlet from the enclosure via the air filter, said enclosure inlet and enclosure outlet defining respectively an upstream end of the air supply path and a downstream end of the air supply path, wherein the enclosure housing the air compressor is subdivided by a dividing plate which holds the air filter upstream of the air compressor, the dividing plate also having an air inlet feature to allow air to enter an inlet to the air compressor after the air has passed through the air filter, said air filter being removably held in a matching aperture in the dividing plate.

The matching aperture in the dividing plate permits the air filter to be changed when necessary.

The use of a single enclosure for the battery, air compressor, air filter and bypass provides manufacturing economies, particularly if the enclosure is formed predominantly from plastics materials.

The enclosure may be unitary in the sense that it forms a single unit around components within the enclosure, and is not formed form separate units, for example connected together by flexible hoses. The enclosure preferably has a main housing that is integrally formed, with the access panels being removably affixed to the main housing. In a preferred embodiment of the invention, the main housing forms a base portion of the hollow enclosure, and the access panels form an upper portion of the hollow enclosure.

The air inlet feature may be the aperture in the dividing plate.

Preferably, the housing has an access panel removably affixed to the housing, which may be removed from the housing to gain access the air filter to permit the air filter to be changed.

In a preferred embodiment of the invention, the access panel extends over the dividing plate.

Preferably, the air inlet feature engages with the air inlet to the air compressor to align the air compressor within the housing.

In a preferred embodiment of the invention, the apparatus includes an automatic air bypass within the enclosure that directs air in the air supply path to the air compressor when this is activated, and which allows air to in the air supply path to bypass the air compressor when this is not activated. The air bypass may then be incorporated in the dividing plate.

The air bypass includes may also include a passive valve that operates automatically depending on air pressure differences within the enclosure. Preferably, the passive valve is a flexible flap valve that is resiliently biased to a closed position, and which is pulled open under the action of air pressure in the air supply path when the compressor is activated.

BRIEF DESCRIPTION OF THE DRAWINGS

The invention will now be described by way of example, with reference to the accompanying drawings, in which.

DETAILED DESCRIPTION

Figure 1:
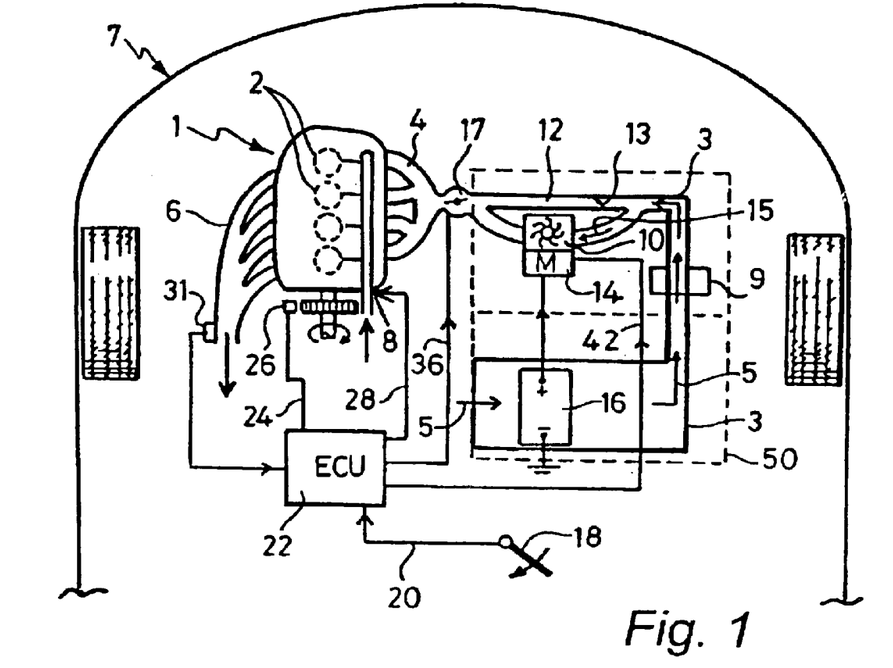
FIG. 1 is a schematic diagram of a motor vehicle having a 1.4 litre, four cylinder engine system with an air intake apparatus that includes an electrically powered intake compressor, according to the invention.

FIG. 1 shows schematically part of a motor vehicle 7 having a supercharged reciprocating piston internal combustion engine 1, with four in-line cylinders 2, an air inlet manifold 4 and an exhaust manifold 6 leading to and from each of the cylinders 2, and a fuel injection system 8 for supplying fuel to cylinders 2 in a manner well-known in the art. An electrically driven supercharger 10 is provided upstream of the inlet manifold 4.

Air flows to the inlet manifold 4 through the supercharger 10 when this is operational, or when the supercharger is disabled, through an air bypass conduit 12 in parallel with the supercharger 10. Air is supplied to the supercharger 10 and/or the bypass 12 along an inlet air path 3.

The air bypass conduit 12 has an air valve 13 that automatically opens to permit inlet air 5 to bypass the supercharger when the supercharger airflow 15 is insufficient to charge the engine cylinders 2 with air. The air supply to the engine 1 is then controlled by the setting of a throttle valve 17 downstream of the supercharger 10 and bypass 12, and the activation of the supercharger 10. When the supercharger 10 is not activated, the engine 1 is normally aspirated, and when the supercharger 10 is activated, the airflow to the engine is increased.

The supercharger is driven only by a switched reluctance electrical motor (M) 14 powered by a 12-volt lead/acid vehicle battery 16 and a belt-driven alternator (not shown). The battery has a current rating which is about 30 A higher than would normally be specified for a mass-market four cylinder engine motor car. In addition to powering the supercharger, the battery 16 also provides for the vehicle starting, lighting and ignition requirements. As indicated by FIG. 1, the battery 16 also lies within the air supply path 3, so that inlet air flows around the battery 16.

An air filter 9 is provided in the air supply path 3 downstream of the battery 16 and upstream of the supercharger 10 and air bypass 12.

As will be explained in more detail below, the battery 16, filter 9, supercharger 10 and air bypass 12 are all housed within a hollow enclosure 50.

The vehicle driver (not shown) can control the engine power via a movable accelerator pedal assembly 18, that provides an electrical signal 20 to an engine control unit (ECU) 22. The engine control unit receives a number of input signals indicative of engine and vehicle operating parameters, including an engine speed signal 24 from an engine speed sensor 26. The engine control unit 22 calculates an engine torque demand from the various input signals, and provides a number of output signals to control various vehicle and engine operating parameters, including a fuel injection control signal 28, throttle valve control signal 36 and a supercharger motor control signal 42. The engine torque demand is therefore set at least in part by the position of the accelerator pedal.

As will be explained in more detail below, when the driver moves the accelerator pedal to demand engine torque in excess of that which can be delivered by the engine 1 when naturally aspirated, the throttle valve 17 moves to a maximum setting to admit the maximum volume of air into the cylinders, and engine control unit 22 then activates the supercharger motor 14 under certain moderate or low engine speeds, but not at high engine speeds. Thereafter, the boosted engine torque output is controlled by the supercharger speed and the amount of fuel supplied to the cylinders. If the engine is an injection engine, the engine control unit 22 can control the amount of injected fuel by electrical control of the injectors.

Preferably, the engine includes an exhaust gas sensor 31 for monitoring engine combustion conditions. The sensor 31 may be an exhaust gas oxygen (EGO) sensor. This can be used to determine if the engine is running lean or rich. The engine control unit 22 first sets both the supercharger speed and delivered fuel amount according to the current torque demand. The engine control unit monitors the output from the sensor 31, and then adjusts the supercharger speed and/or the amount of delivered fuel to achieve an appropriate level of rich or lean engine operation.

Figure 2:
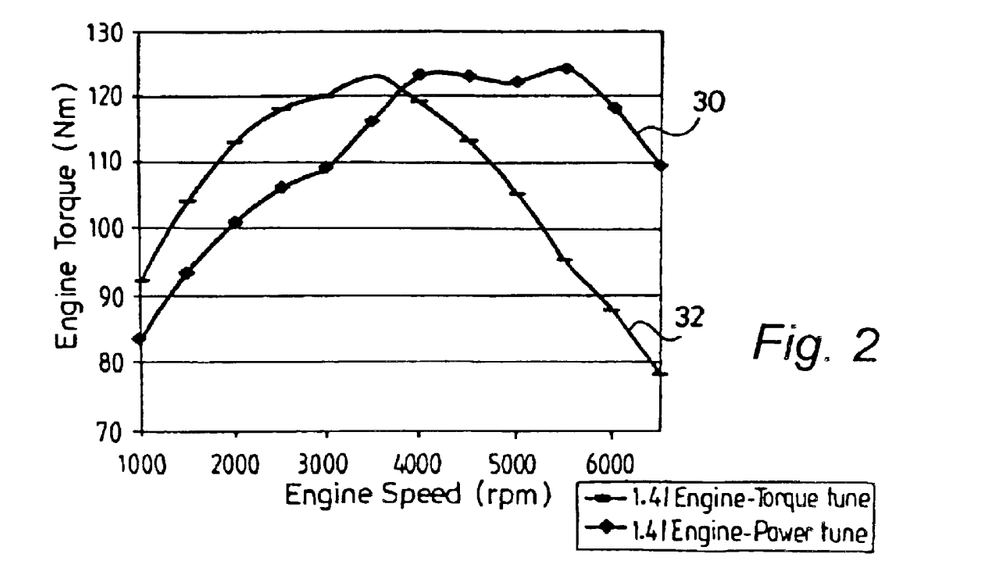
FIG. 2 is a graph plotting engine torque against engine speed for the 1,4 litre engine of FIG. 1 when naturally aspirated, tuned either for maximum torque at a low moderate engine speed, or maximum engine torque at a higher moderate engine speed.

FIG. 2 shows a graph of engine torque against engine speed for a conventional four-cylinder in-line engine, such as that described above, but without supercharging. As can be seen from curve 30 of FIG. 2, the engine can be tuned to provide good power at moderately high engine speeds ("power tune"), but at the expense of low-end torque.

Alternatively, as shown by curve 32, the engine can be tuned to give good torque at low and moderate engine speeds ("torque tune"), but at the expense of top-end power. Whilst "power tune" will appeal to the 'sporting' driver, it will result in lower levels of satisfaction for the majority of car owners. The requirement to deliver good real world 'performance feel' commonly results in an engine torque output as shown in the "torque tune" curve, where torque at high engine speeds has been compromised in order to promote torque output below 3500 rpm. Although engine gearing can be selected to minimize undesirable characteristics, in practice conventional engines are tuned to achieve a compromise.

Figure 3:
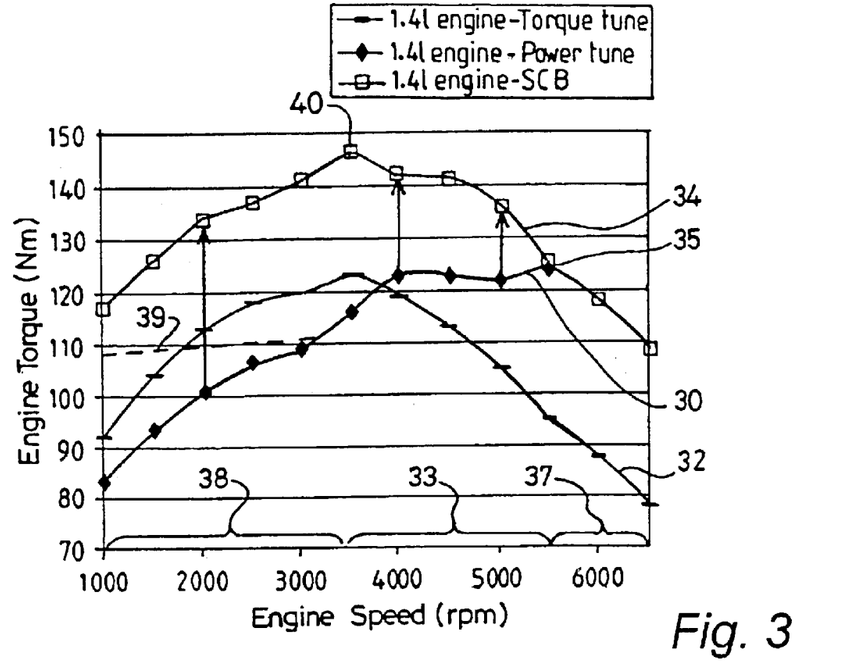
FIG. 3 is a graph similar to that of FIG. 2, showing also the effect on engine torque output with the engine of FIG. 1 when using the intake compressor.

With reference to FIG. 3, in the preferred embodiment of the invention, a relatively low capacity engine, for example below about 1.8 litres capacity, is tuned to give good power at high rpm, at the expense of torque at low engine speed, as illustrated by curve 30. This has the secondary effect of allowing good fuel economy at steady highway cruising speeds through the need to use wider throttle openings to achieve cruising speed. As can be seen from curve 34, an increase in maximum engine torque is then provided with a supercharger torque boost (or equivalently engine power boost) when the driver demands power in excess of that available from a naturally aspirated engine, as shown by the curve with supercharger boost "SCB". The boost is made available under control of the engine control unit 22 only in a region of low 38 and moderate engine speeds 33, and is progressively limited to transition smoothly into engine power at point 35 without compressor torque boost in a region of higher engine speeds 37. This is done by progressively limiting the maximum allowable supercharger boost proximate a transition point 40, which in this example is taken at the maximum un-boosted engine torque. It is, however, possible to deviate either above or below this point, although a deviation too far below this point (in this example below about 3500 rpm) reduces the potential benefits provided by the supercharger, and a deviation too far above this point (in this example above about 5750 rpm) will lead to excess torque in a region of engine operation where this is not needed under most driving conditions, or desired from the point of view of fuel economy.

Thus, the engine controller enables use of the compressor driver only in such a way that the engine torque output with the compressor torque boost peaks in the region of moderate engine speed.

The boosted torque curve could, however, transition smoothly into the un-boosted torque curve 30 in a region of lower engine speeds 38, as shown by dashed line 39.

Figure 4:
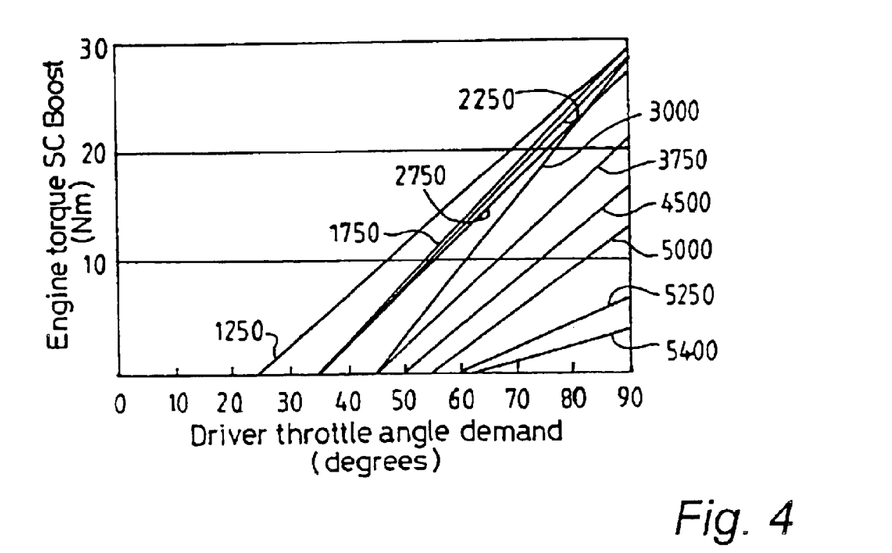
FIG. 4 is a graph plotting engine compressor torque boost against driver throttle engine demand for the engine of FIG. 1.

FIG. 4 shows a graph of engine torque supercharger boost against driver throttle angle demand between 0° and 90°. The diagonal straight lines on the graph are labelled with engine speed in rpm, between 1250 rpm and 5400 rpm. The vertical scale corresponds between the difference in engine torque in FIG. 3 between the boosted torque curve 34 and the un-boosted torque curve 30. At the maximum throttle angle 90°, the engine torque supercharger boost is the maximum value shown in FIG. 3. As throttle angle demands declines from 90°, so does the engine torque supercharger boost, until this declines to zero boost corresponding to curve 30 of FIG. 3.

As can be seen from FIG. 4, as the engine speed increases towards the transition point 35 of FIG. 3, the slope of the engine torque supercharger boost curve declines, until at the transition point 35, there is no engine torque supercharger boost. This shows graphically the progressive disabling of the supercharger boost.

Figure 5:
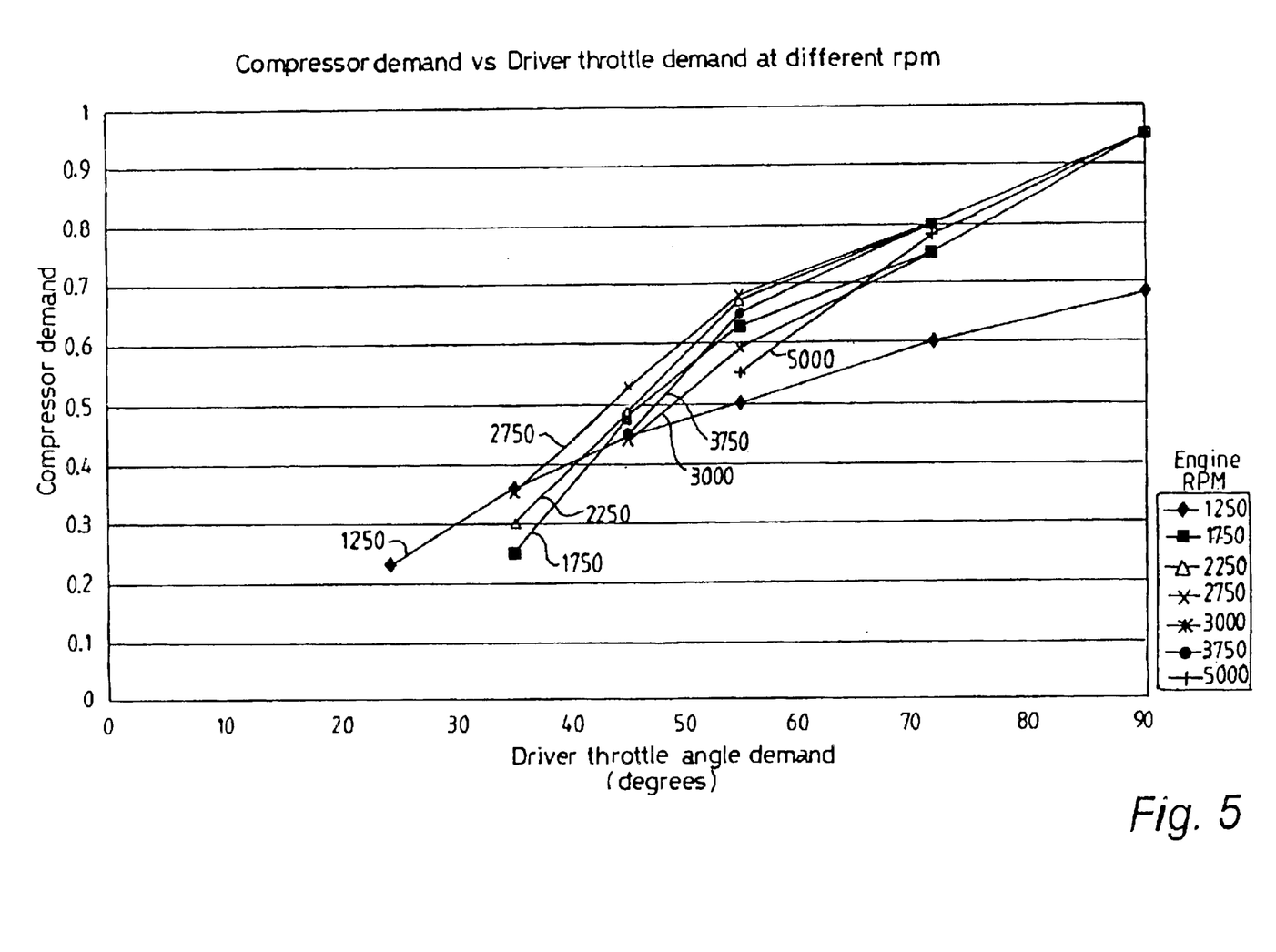
FIG. 5 is a graph of compressor demand against driver throttle angle demand for the engine of FIG. 1.

FIG. 5 shows the operation of the supercharger in another way, with compressor demand plotted against driver "throttle angle" demand between 0° and 90°. Except at high engine speeds when operation of the supercharger is disabled, the driver "throttle angle" does not correspond with the actual angle of the throttle 17. At engine speeds where supercharger operation is permitted, the actual throttle angle will reach 90° (i.e. the maximum setting) before the driver "throttle angle" reaches 90°. Thereafter, as driver throttle angle increases towards 90°, the actual throttle angle remains at the maximum setting, and the boosted engine torque output is controlled by the amount of electrical power supplied to the supercharger motor, in conjunction with an appropriate amount of fuel delivered to the cylinders.

The various lines in FIG. 5 are labelled with the engine speed in rpm. The compressor demand is equivalent to the electrical power supplied to the supercharger motor 14. The plots begin at a compressor demand at about 0.2, at which point the air supplied by the supercharger begins to have an appreciable effect on engine torque. As can be seen from FIG. 5, as engine speed increases, so does the minimum compressor demand needed to appreciably boost torque. This is due to the increased air flow to the inlet manifold 4 as engine speed increases.

Figure 6:
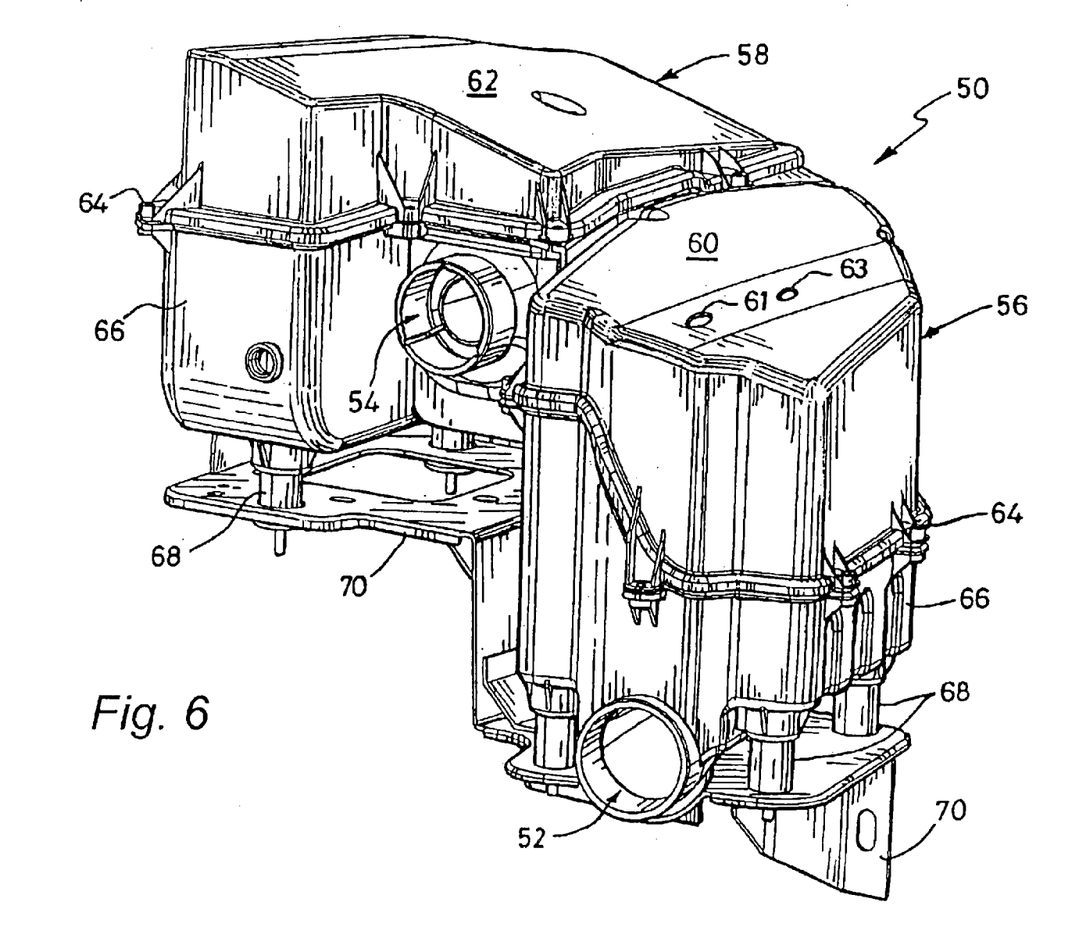
FIG. 6 is a perspective view of the air intake apparatus used with the engine of FIG. 1.

FIGS. 6 to 14 all show detailed views of the air intake apparatus according to the invention. FIG. 6 shows an external perspective view of the unitary housing 50 that holds the battery 16, filter 9, compressor 10 and air bypass 12. The air supply path 3 through the unitary housing 50 begins at an air inlet 52 in a lower portion of the housing 50, and terminates at an air outlet 54 at a higher level in the housing 50.

The housing 50 includes the battery compartment 56 and the supercharger compartment 58. Each compartment 56,58 has a corresponding access panel 60,62 which is removably attached by screws 64 to a unitary housing base 66 that forms a lower part of the enclosure 50.

The battery compartment access panel 60 has a pair of apertures 61,63, by which a pair of battery terminals 65,67 can protrude through the housing 50 when the battery access panel is affixed to the housing base 66.

The unitary housing base 66 is mounted at a number of supports 68 extending downwards from the housing base 66 to a steel mounting plate 70, which is itself bolted to an inner surface of an engine compartment (not shown).

The hollow enclosure 50 is formed from a moulded plastics material, for example ABS, or glass-filled nylon.

Figure 7:
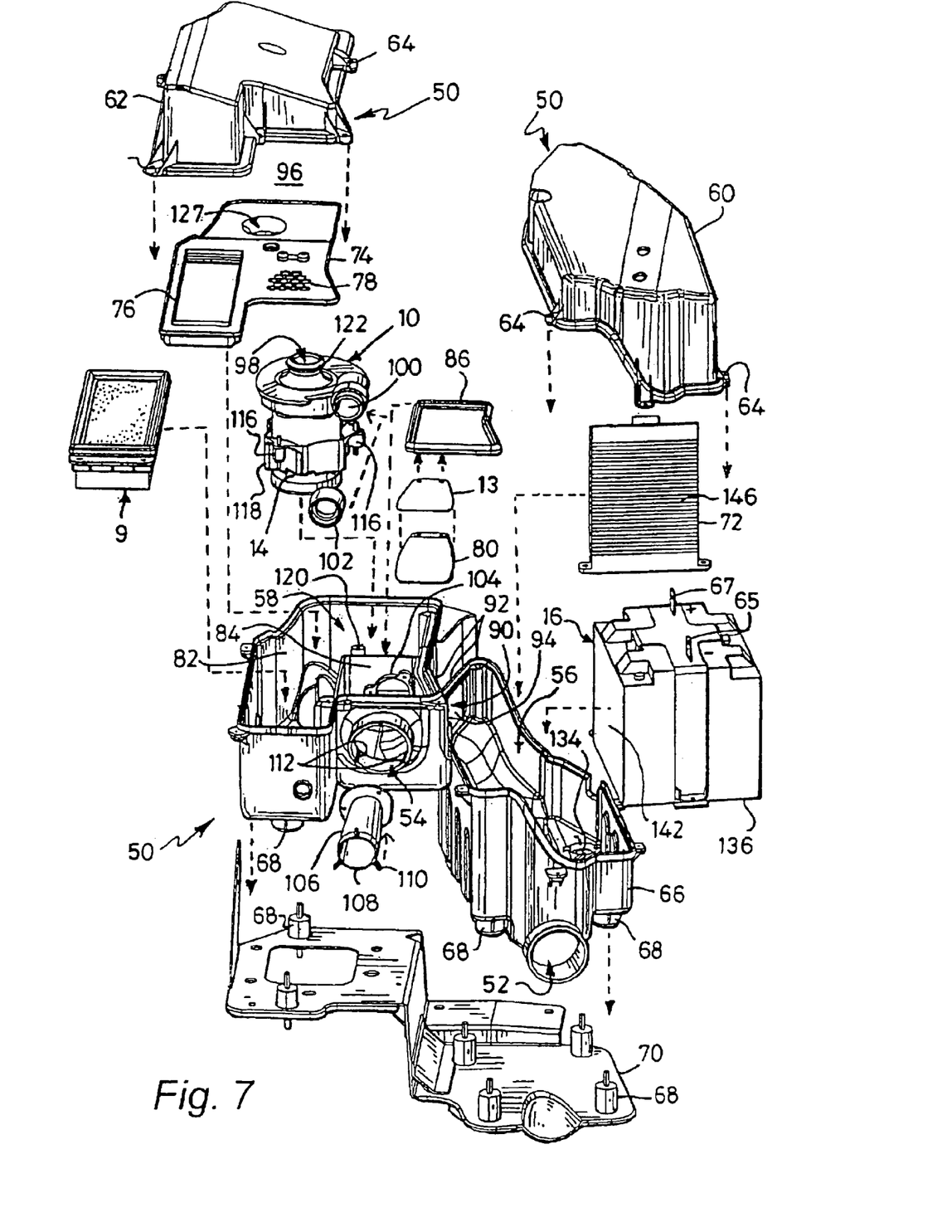
FIG. 7 is an exploded view of a housing and internal components that form the air intake apparatus of FIG. 6.
Figure 8:
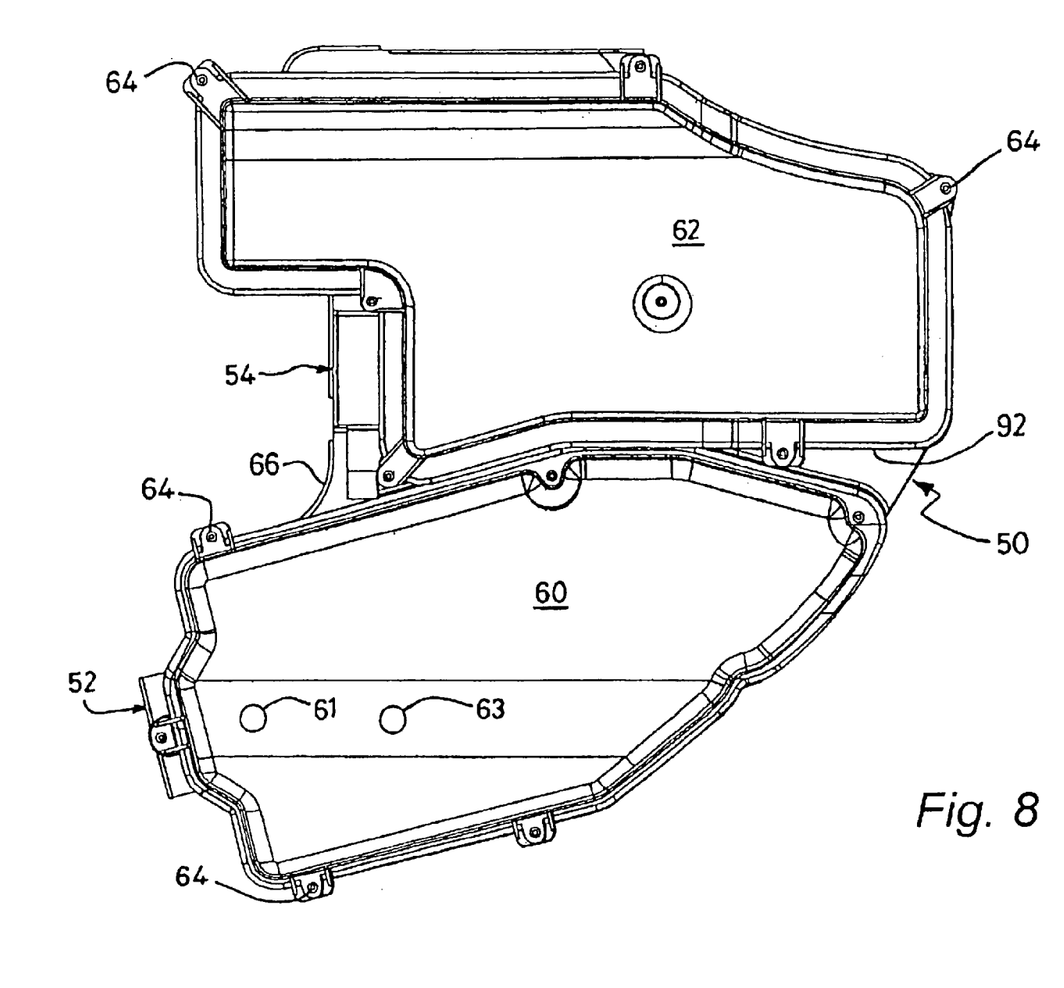
FIG. 8 is a top plan view of the air intake apparatus of FIG. 7, showing two separate removable access panels on upper surfaces of the housing.

FIG. 7 shows the mounting plate, hollow enclosure 50 and a number of components inside the enclosure 50 in an exploded, perspective, view. The battery 16 is housed within the battery compartment 56, together with supercharger drive electronics 72.

The supercharger compartment 58 contains a larger number of components, including the filter 9, supercharger 10 and supercharger motor 14. Also in the supercharger compartment 58 are the dividing plate 74 that extends horizontally across a portion of the supercharger compartment 58 beneath the supercharger access cover 62, and the flap air bypass valve 13. The air filter 9 has a rectangular outline, and sits within a similar rectangular recess 56 within the dividing plate 74. The dividing plate 74 has an air grill 78 to the underside of which is attached the air flap 13, and a curved plate 80 to limit the deflection of the air flap 13 away from the grill 78.

The supercharger compartment 58 is divided into a main portion 82, which houses the compressor 10, motor 14 and air filter 9, and a minor portion 84, which is referred to herein as a diffuser chamber 84. The dividing plate air grill 78, and air flap 13 lie over the diffuser chamber 74, with a flexible seal 86 making an air-tight seal between the diffuser chamber 84 and dividing plate 74.

The air supply path 3 between the air inlet 52 and air outlet 54 extends around the battery 16 and supercharger power electronics 72 within the battery compartment 56, through an aperture 90 in a partition wall 92 that separates the battery compartment 56 from the supercharger compartment 58. As can be seen from FIG. 7, the air aperture 90 is at a higher level in the battery compartment 56 from the air inlet 52. The air supply path through the battery compartment 56 therefore generally rises towards the air aperture 90.

The air aperture 90 has a number of vanes, one of which 94 is visible in FIG. 7. These vanes 94 direct the air flow into a lower portion of the supercharger compartment 58, in the vicinity of the supercharger motor 14. The air supply path therefore helps to cool the supercharger motor 14 when this is operational. The air supply path 3 after flowing around the supercharger motor 14 rises vertically upwards through the air filter 9 in the dividing plate 74 into an air volume between the dividing plate 74 and supercharger access panel 62. In FIG. 7, this enclosed air volume is indicated generally by reference numeral 96.

When the supercharger is not operational, the air suction provided from the inlet manifold 4 holds the flap valve 13 downwards onto the flap valve limiting plate 80, so that air can flow through the air grill 78 in the dividing plate 74, and into the diffuser chamber 84. From the diffuser chamber 84, the air is then free to pass into the air outlet 54. Although not shown, the air path then follows a conventional flexible hose to the throttle valve 17.

When the supercharger is operational, some air from the enclosed air volume 96 will be drawn into an inlet 98 in an upper central portion of the supercharger 10. The supercharger air is then compressed and expelled at up to 40% above atmospheric pressure through the supercharger outlet 100. A small rubber ring 102 connects the supercharger air outlet 100 to an inlet 104 to the diffuser chamber 84.

Until the supercharger 10 is operating at a high capacity, there will be some air also entering through the air flap 13 into the diffuser chamber 84. The air expelled by the supercharger 10 through the diffuser chamber air inlet 104 passes into a diffuser pipe 106 that tapers gradually outwards to a diffuser pipe outlet 108. The diffuser pipe outlet 108 has three radial fins 110 equilaterally spaced around the circumference around the space of the diffuser pipe outlet 108. The fins 110 slot into corresponding grooves 112 on inner surfaces of the air outlet 54 so that an annular gap 114 is maintained between the air diffuser pipe 106 and air outlet 54.

The air expelled by the supercharger 110 is therefore kept separate from air entering through the flap valve 13 into the diffuser chamber 84 until this air mixes downstream of the annular gap 114 surrounding the diffuser pipe outlet 108.

It has been found that the air flow efficiency is increased by this arrangement, as energy in the air expelled by the supercharger 10 helps to pull air out of the diffuser chamber 84 supplied through the air flap valve 13.

In order to dampen noise and vibration, the supercharger 10 and its motor 14 are physically mounted through three rubber posts 116 spaced equidistantly around a cup-shaped aluminium mounting bracket 118 to which the supercharger 10 has been rigidly mounted. The three rubber mounts 116 sit on three corresponding posts 120 extending upwards from a lower portion of the supercharger compartment 58. These three rubber mounts 116, together with the flexible short outlet hose 102 between the supercharger outlet 100 and diffuser chain inlet 104, dampen down any vibration which might be transmitted from the supercharger 10 and its motor 14 through to the body of the unitary housing 66.

The supercharger 10 is also vibrationally isolated from the dividing plate 74 by a rubber ring 122 that extends around the circumference of the supercharger air inlet 98. The rubber ring 122 sits within a circular boss 124 that extends downwards from an undersurface 126 of the dividing plate 74. The boss 124 has a passage 127 therethrough to allow air to flow through the dividing plate 74 into the supercharger 10.

Figure 9:
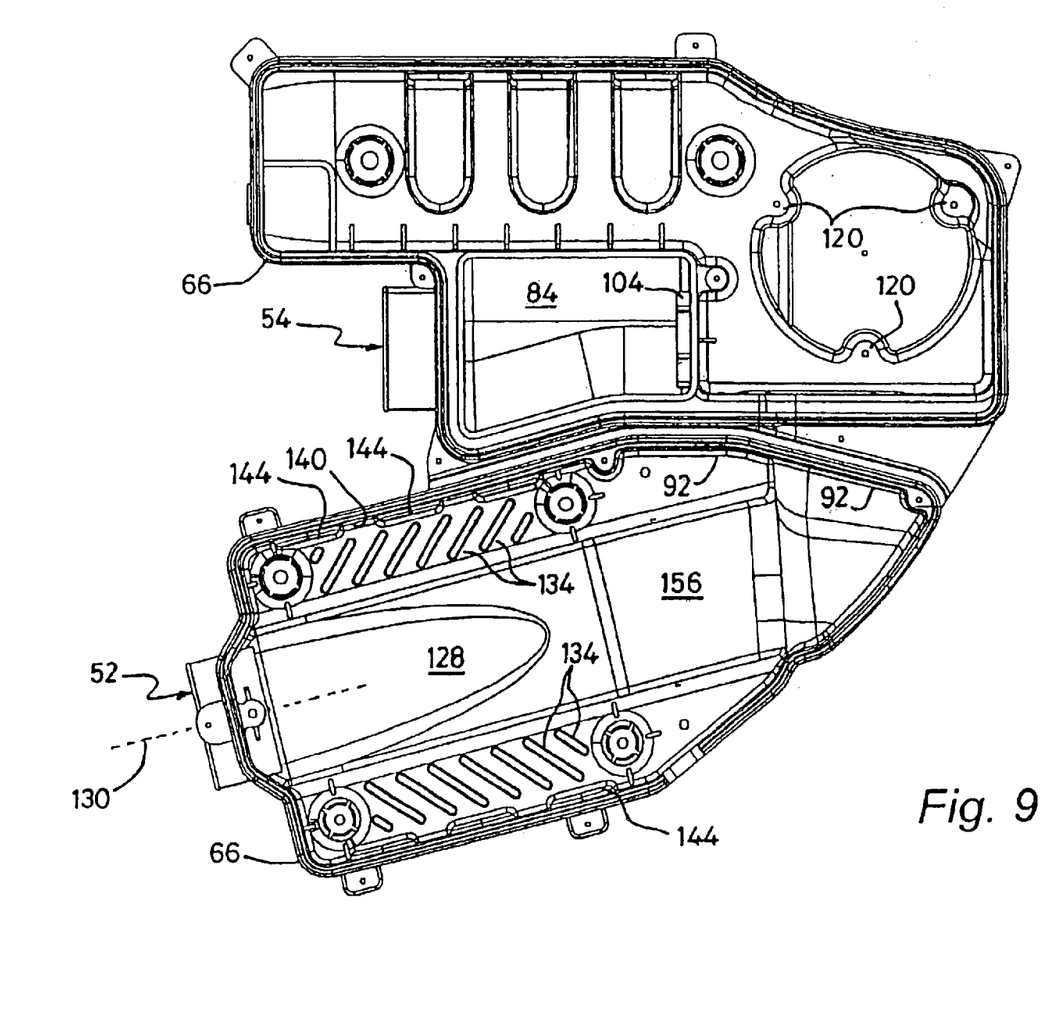
FIG. 9 is a top plan view of the air intake apparatus similar to that of FIG. 8, but with the two access panels removed, and no components within the housing.
Figure 10:
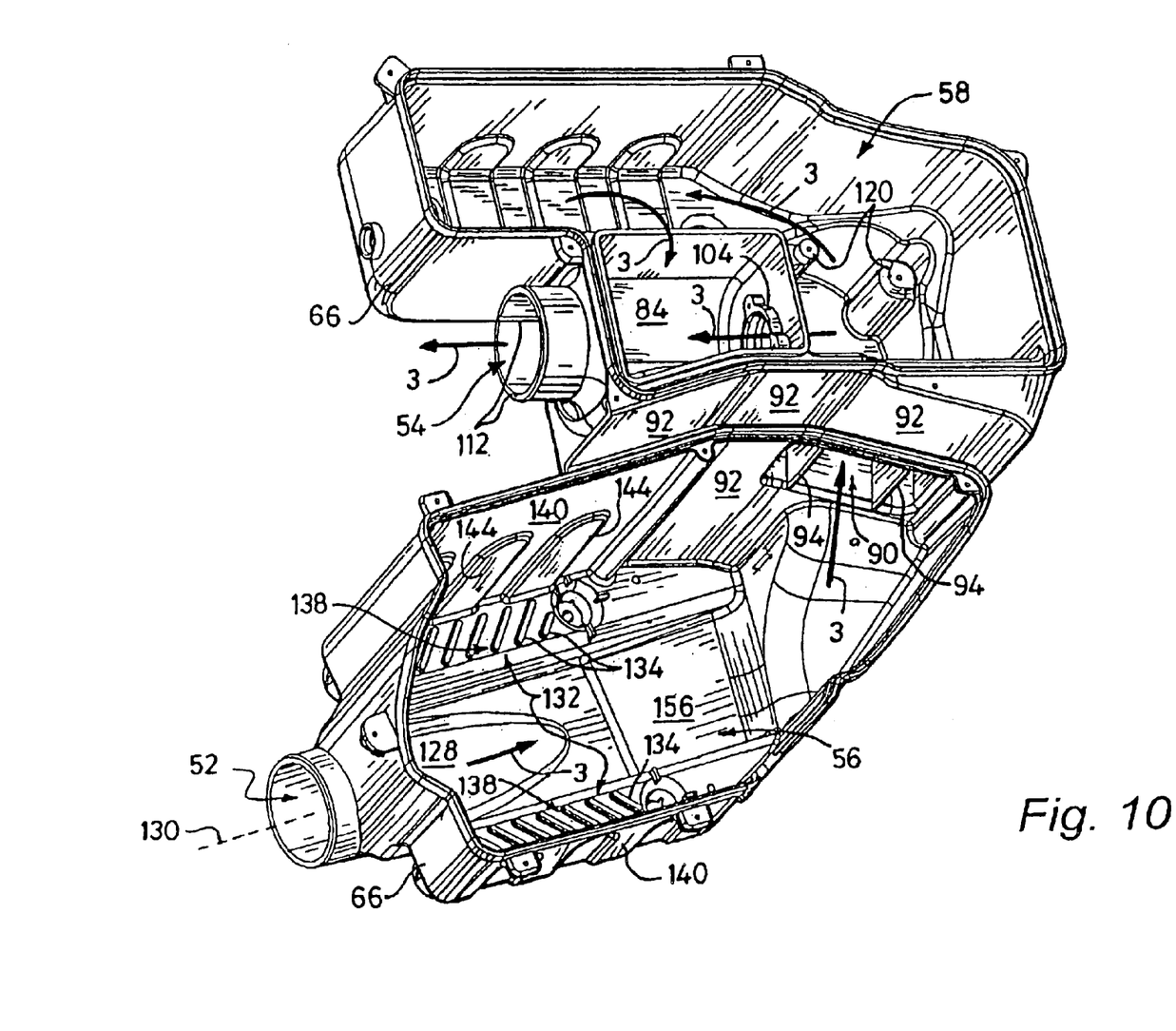
FIG. 10 is a perspective view of the empty housing of FIG. 9.
Figure 11:
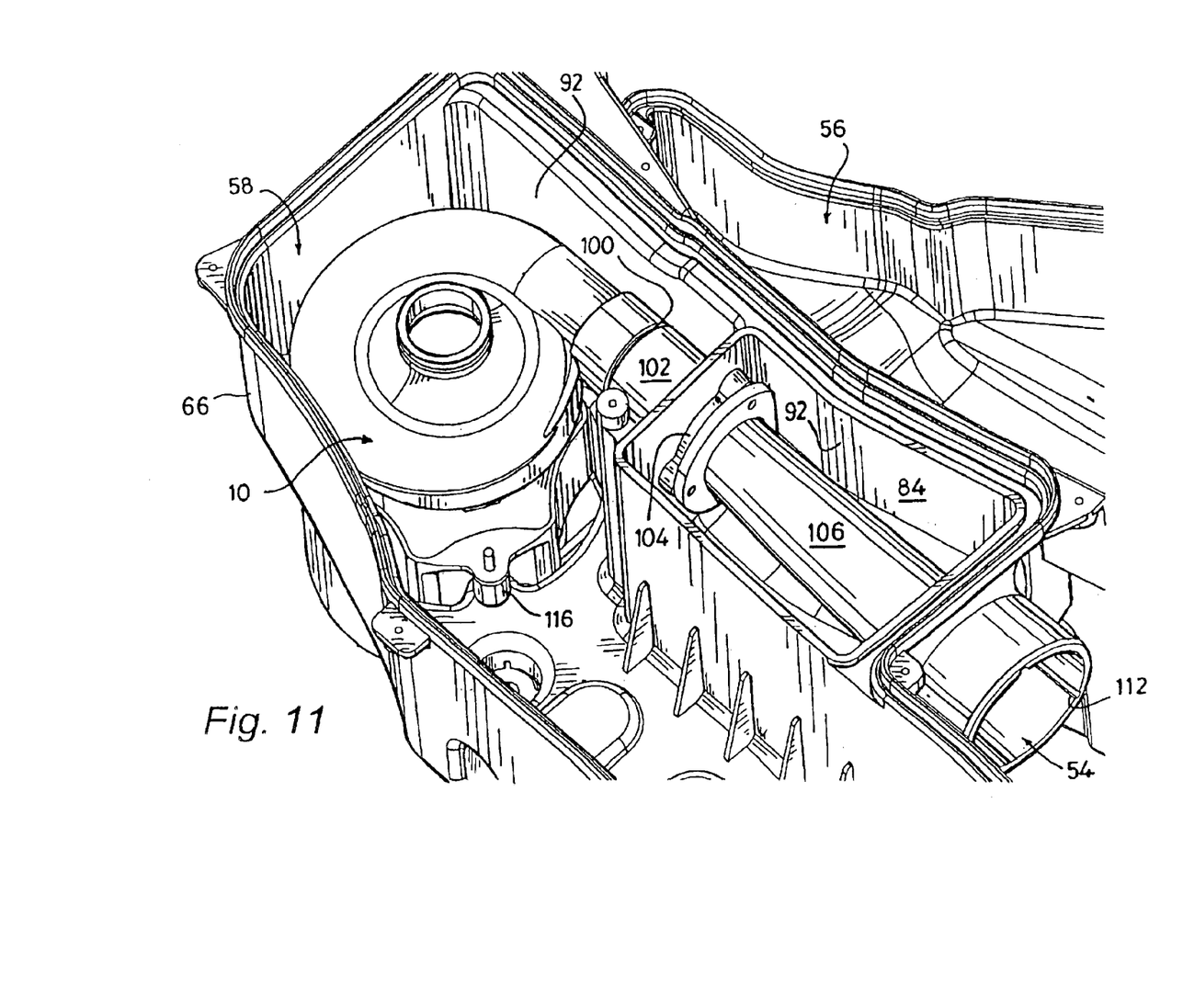
FIG. 11 is a perspective view of a portion of the housing, with an access panel removed to show the compressor within the housing, and an air outlet pipe from the compressor extending through an air diffuser chamber to an air outlet from the housing.
Figure 12:
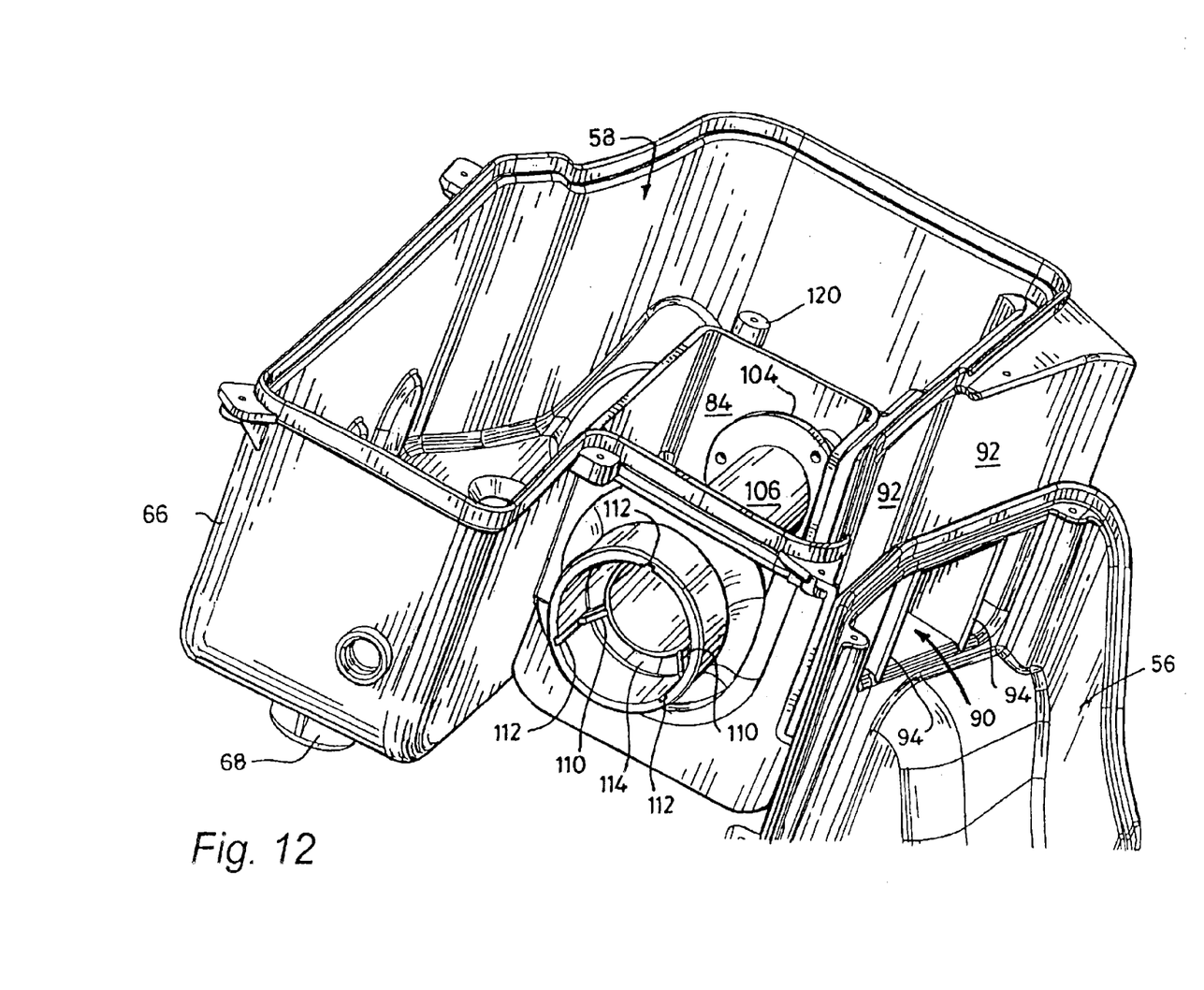
FIG. 12 is a different perspective view of the portion of the housing shown in FIG. 11, looking into the air outlet to show the arrangement of the air outlet pipe with respect to the air outlet and the diffuser chamber.
Figure 13:
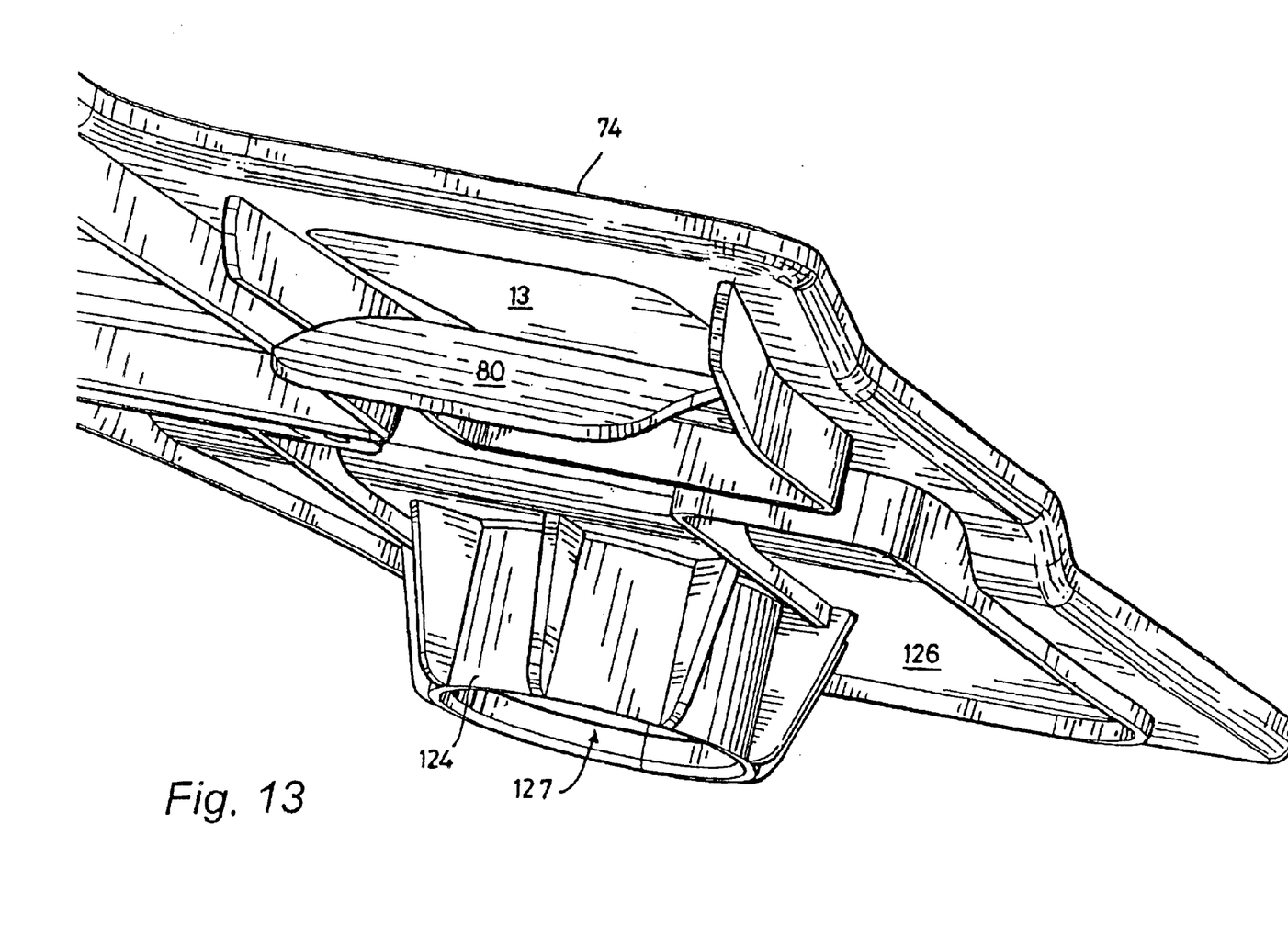
FIG. 13 is a perspective view from underneath of a portion of a dividing plate that covers the air compressor and air diffuser chamber of FIGS. 11 and 12, showing an air flap valve in the diffuser plate in a closed position.
Figure 14:
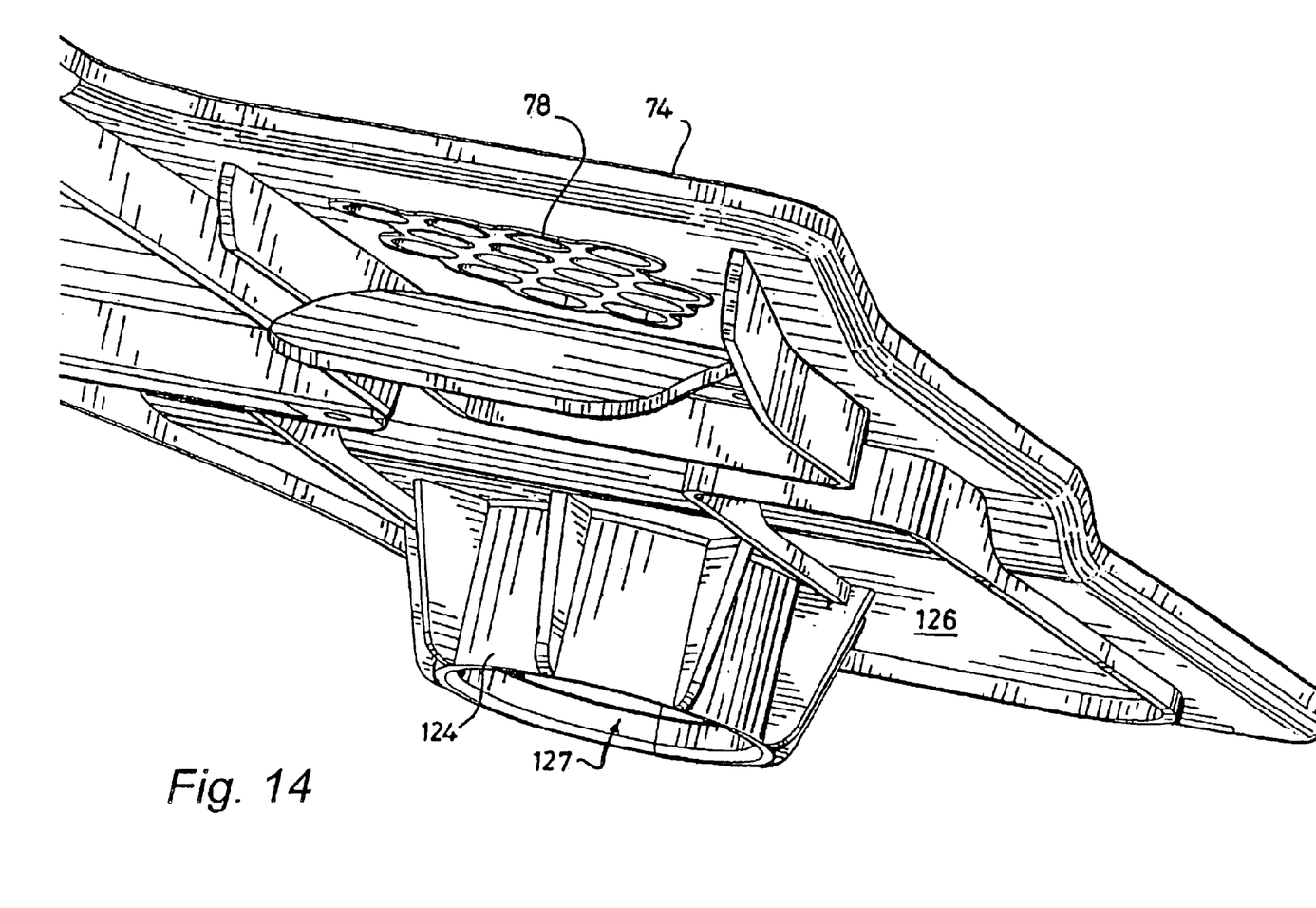
FIG. 14 is a perspective view similar to that of FIG. 13, with the air flap valve removed to show an air grille through the dividing plate by which bypass air flows into the diffuser chamber to the housing air outlet.

Referring now to FIGS. 9 and 10, these show how the air inlet path 3 extends into the battery compartment 56 initially in a recess 128 in a lower surface 156 of the battery compartment 56. The recess 128 gradually disappears downstream of the air inlet 52, thereby forcing inlet air to move laterally away from an axis 130 of the air inlet 52 towards lateral side portions 132 of the battery compartment 56, where there are a number of upstanding ribs 134 projecting from the side portions 132. The ribs 134 support an undersurface 136 of the battery 16, so that air channels 138 extend between the ribs 134 laterally away from the air inlet axis 130. Inlet air is therefore directed across nearly the full undersurface of the battery, which helps to keep the battery cool. Once the inlet air reaches lateral side walls 140 of the battery compartment 56, the air is directed to flow upwards over corresponding vertically extending sides 142 of the battery 16 by vertically extending ribs 144 that project laterally inwards from the battery housing vertical side walls 140. The vertical ribs 144 also help to locate the battery 16 transversely within the battery compartment 56.

Some air will, however, flow downstream of the battery 16 at a lower level to encounter the supercharger power electronics 72, which is provided with metallic heat dissipation fins 146.

The temperature of the inlet air therefore increases as it passes through the battery compartment 56, but the air is still cool compared with the temperatures that may be reached by the supercharger motor 14 (and significantly cooler than the air temperatures that would be encountered in a turbocharged or positive displacement supercharger system). This therefore provides an efficient means of cooling the various components within the housing 50.

The air intake arrangement described above is both compact and economical to manufacture, and is suitable for use with relatively low capacity motor vehicle internal combustion engines.

It is to be recognized that various alterations, modifications, and/or additions may be introduced into the constructions and arrangements of parts described above without departing from the spirit or scope of the present invention, as defined by the appended claims.

What is claimed is:

1. An air intake apparatus for supplying air to an internal combustion engine, comprising a hollow enclosure, an air filter and an air compressor which when activated compresses air supplied to the engine, the enclosure housing the air filter and compressor, an engine air supply path through the enclosure that passes from an air inlet to the enclosure to an air outlet from the enclosure via the air filter, said enclosure inlet and enclosure outlet defining respectively an upstream end of the air supply path and a downstream end of the air supply path, wherein the enclosure housing the air compressor is subdivided by a dividing plate which holds the air filter upstream of the air compressor, the dividing plate also having an air inlet feature to allow air to enter an inlet to the air compressor after the air has passed through the air filter, said air filter being removably held in a matching aperture in the dividing plate.

2. The air intake apparatus of claim 1, in which the air inlet feature is said aperture in the dividing plate.

3. The air intake apparatus of claim 1, in which the air inlet feature engages with the air inlet to the air compressor to align the air compressor within the enclosure.

4. The air intake apparatus of claim 1, in which the enclosure has an access panel removably affixed to the enclosure, which may be removed from the enclosure to gain access the air filter to permit the air filter to be changed.

5. The air intake apparatus of claim 4, in which the access panel extends over the dividing plate.

6. An air intake apparatus for supplying air to an internal combustion engine, comprising:

a hollow enclosure, an air filter and an air compressor which when activated compresses air supplied to the engine, the enclosure housing the air filter and compressor, an engine air supply path through the enclosure that passes from an air inlet to the enclosure to an air outlet from the enclosure via the air filter, said enclosure inlet and enclosure outlet defining respectively an upstream end of the air supply path and a downstream end of the air supply path, wherein the enclosure housing the air compressor is subdivided by a dividing plate which holds the air filter upstream of the air compressor, the dividing plate also having an air inlet feature to allow air to enter an inlet to the air compressor after the air has passed through the air filter, said air filter being removably held in a matching aperture in the dividing plate, an access panel removably affixed to said enclosure which may be removed from said enclosure to gain access to the air filter to permit the air filter to be changed, the access panel extending over said dividing plate and defining a volume of clean air between the dividing plate and the access panel that is drawn through the air filter towards an air outlet.

7. An air intake apparatus for supplying air to an internal oombustion engine, comprising a hollow enclosure, an air filter and an air compressor which when activated compresses air supplied to the engine, the enclosure housing the air filter and compressor, an engine air supply path through the enclosure that passes from an air inlet to the enclosure to an air outlet from the enclosure via the air filter, said enclosure inlet and enclosure outlet defining respectively an upstream end of the air supply path and a downstream end of the air supply path, wherein the enclosure housing the air compressor is subdivided by a dividing plate which holds the air filter upstream of the air compressor, the dividing plate also having an air inlet feature to allow air to enter an inlet to the air compressor after the air has passed through the air filter, said air filter being removably held in a matching aperture in the dividing plate, the air compressor including vibration dampening mounts mounting the air compressor to the enclosure.

8. An air intake apparatus for supplying air to an internal combustion engine, comprising a hollow enclosure, an air filter and an air compressor which when activated compresses air supplied to the engine, the enclosure housing the air filter and compressor, an engine air supply path through the enclosure that passes from an air inlet to the enclosure to an air outlet from the enclosure via the air filter, said enclosure inlet and enclosure outlet defining respectively an upstream end of the air supply path and a downstream end of the air supply path, wherein the enclosure housing the air compressor is subdivided by a dividing plate which holds the air filter upstream of the air compressor, the dividing plate also having an air inlet feature to allow air to enter an inlet to the air compressor after the air has passed through the air filter, said air filter being removably held in a matching aperture in the dividing plate, an automatic air bypass located within the enclosure that directs air in the air supply path to the air compressor when the air compressor is activated and which allows air in the air supply path to bypass the air compressor when the air compressor is not activated.

9. The air intake apparatus of claim 8, in which the air bypass is incorporated in the dividing plate.

10. The air intake apparatus of claim 8, in which the air bypass includes a passive valve that operates automatically depending on air pressure differences within the enclosure.

11. The air intake apparatus of claim 10, in which the passive valve is a flexible flap valve that is resiliently biased to a closed position, and which is pulled open under the action of air pressure in the air supply path when the compressor is activated.

* * * * *